(12) United States Patent
Weier et al.

(10) Patent No.: US 7,217,747 B2
(45) Date of Patent: May 15, 2007

(54) PLASTICS ADDITIVES COMPOSITION, PROCESS, AND BLENDS THEREOF

(75) Inventors: Jane Elizabeth Weier, Hopewell, NJ (US); Morris Christopher Wills, Philadelphia, PA (US); Robert William Coyle, Warrington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 163 days.

(21) Appl. No.: 10/626,068

(22) Filed: Jul. 24, 2003

(65) Prior Publication Data

US 2004/0077756 A1 Apr. 22, 2004

Related U.S. Application Data

(62) Division of application No. 09/740,140, filed on Dec. 20, 2000, now Pat. No. 6,624,212.

(60) Provisional application No. 60/171,991, filed on Dec. 23, 1999.

(51) Int. Cl.
*C08L 83/00* (2006.01)

(52) U.S. Cl. .................. 523/201; 525/83; 525/232; 525/902; 524/523; 524/555; 524/560; 524/562

(58) Field of Classification Search ............. 524/523, 524/555, 560, 562; 523/201; 525/83, 232, 525/902
See application file for complete search history.

(56) References Cited

U.S. PATENT DOCUMENTS

| | | | |
|---|---|---|---|
| 3,494,784 A | 2/1970 | De Coene et al. | |
| 3,513,227 A | 5/1970 | De Coene et al. | |
| 3,813,259 A | 5/1974 | Neubert | |
| 3,833,686 A | 9/1974 | Grochowski et al. | |
| 3,859,389 A | 1/1975 | Carty et al. | |
| 3,985,703 A | 10/1976 | Ferry et al. | |
| 4,097,553 A | 6/1978 | Novak | |
| 4,161,472 A | 7/1979 | Lehr | |
| 4,275,178 A | 6/1981 | Yusa et al. | |
| 4,463,131 A | 7/1984 | Grandzol et al. | |
| 4,522,959 A | 6/1985 | Lindner et al. | |
| 4,522,964 A | 6/1985 | Linder et al. | |
| 4,539,375 A | 9/1985 | Dunkelberger | |
| 4,696,973 A * | 9/1987 | Kamata et al. | 525/71 |
| 4,897,462 A | 1/1990 | Yusa et al. | |
| 5,039,747 A | 8/1991 | Piejko et al. | |
| 5,112,910 A | 5/1992 | Piejko et al. | |
| 5,306,763 A | 4/1994 | Matsumoto et al. | |
| 5,362,795 A | 11/1994 | Matsumoto et al. | |
| 5,442,012 A | 8/1995 | Kempner et al. | |
| 5,514,772 A | 5/1996 | Suzuki et al. | |
| 5,541,256 A | 7/1996 | Takaki et al. | |
| 5,612,413 A | 3/1997 | Rozkuszka et al. | |
| 6,624,212 B2 * | 9/2003 | Weier et al. | 523/201 |
| 6,730,734 B1 * | 5/2004 | Hamilton et al. | 524/523 |

FOREIGN PATENT DOCUMENTS

| | | |
|---|---|---|
| EP | 037686 | 10/1981 |
| EP | 418685 | 3/1991 |
| EP | 0 473 379 | 3/1992 |
| EP | 527605 | 2/1993 |
| EP | 527605 A1 | 2/1993 |
| EP | 527605 A1 * | 2/1993 |

\* cited by examiner

*Primary Examiner*—Robert D. Harlan
(74) *Attorney, Agent, or Firm*—Richard C. Clikeman

(57) ABSTRACT

The plastics additives powder compositions of the present invention are provided as powder particles having impact modifier particles and processing aid particles which are coagulated and dried. When blended in thermoplastic resins, such as PVC, the subject plastics additives powders both increase the impact strength and improve process efficiency and melt strength. The impact and processing properties achieved by the present invention are more efficient than using separate impact modifier and processing aid powders. The method of preparing the powder compositions of the present invention also enable impact modifier particles having rubber weight fractions greater than 88% to be isolated as free-flowing powders.

11 Claims, No Drawings

PLASTICS ADDITIVES COMPOSITION, PROCESS, AND BLENDS THEREOF

CROSS REFERENCE TO RELATED PATENT APPLICATION

This non-provisional application is a divisional of non-provisional U.S. patent application Ser. No. 09/740,140, filed Dec. 20, 2000 now U.S. Pat. No. 6,624,212, now allowed, benefit of which is claimed under 35 U.S.C. § 120 and which in turn claims benefit under 35 U.S.C. § 119(e) of U.S. provisional Application No. 60/171,991, filed Dec. 23, 1999, priority benefit of which is also claimed for the present divisional application.

The present invention relates to a plastics additives powder composition, a process for preparing the same, thermoplastic resin blends containing the same, and methods of improving the impact properties and enhancing processability of thermoplastics. These compositions and processes provide plastics additive powders having excellent powder flow properties that provide a combination of superior impact strength and processability to thermoplastic resins, especially polyvinyl chloride.

Thermoplastic resins ordinarily require various additives for modifying their processing and/or property characteristics. Examples of such additives for plastics include: dyes and pigments for altering color; thermal stabilizers and antioxidants for reducing degradation and coloring during processing, high temperature use, and/or long-term weathering; fillers for reducing cost and/or increasing rigidity; lubricants for improving processability and reducing sticking to machine surfaces; antistatic agents for reducing build up of static charge in plastic parts; plasticizers for increasing plasticity and flexibility; impact modifiers ("IM") for improving impact strength to reduce part breakage; and high polymer processing aids ("processing aids", "PA") for controlling the rheological characteristics for optimizing resin processability and increasing process efficiency.

During the preparation of thermoplastic resin blends and plastic part fabrication, the various additives are usually added as separate powdered, pelletized, or liquid components to the thermoplastic resin. Because thermoplastic blend formulation usually requires one to handle many materials having varied physical properties, preparation of these blends is both costly and complex. (Generally, see "*Plastics Additives and Modifiers Handbook*", J. Edenbaum, Ed., Van Nostrand Rein, 1992 for discussion of various additives for plastics.)

It is therefore desirable to obtain compositions of plastics additives that not only reduce cost but also reduce the complexity of preparing fully formulated thermoplastic resin blends. It is also desirable to obtain compositions of plastics additives that provide further improvements to the physical use properties as well as the processability of fully formulated thermoplastic resin blends.

Impact modifiers for thermoplastic resins are rubber-containing particles, typically having diameters in the range of from 50 to 1000 nm, which are dispersed throughout the thermoplastic resin. Conventionally, these impact modifiers include at least one rubbery polymer particle surrounded by at least one hard polymer shell and are prepared using emulsion polymerization techniques. The rubbery polymer portion is believed to enable the thermoplastic matrix resin to absorb physical shocks, prevent crack initiation, and prevent crack propagation in plastic parts, resulting in reduced breakage and increased impact strength. For high impact efficiency the mean particle size of the impact modifier should generally be greater than 100 nm. Such rubbery polymers are conventionally based on units derived from ethylenically unsaturated monomers that provide glass transition temperatures ("Tg") below 25° C. Examples of monomers that provide rubbery polymers include butadiene, isoprene, C1–C8 alkyl acrylates, alpha-olefins, ethylenically unsaturated siloxanes and ethers, and copolymers of mixtures thereof.

Because polymer particles tend to be sticky and not isolatable as a dry powder, a hard polymer shell is typically added to the exterior of each rubbery "core" particle in order to prepare impact modifiers as dry powders that are easily handled. The hard polymer shells of impact modifiers are ordinarily selected to be compatible with the thermoplastic resin so that the impact modifier ("IM") disperses readily into the thermoplastic resin during compounding. The hard polymer shells are usually derived from vinyl aromatic (e.g., styrene), methacrylic (e.g., methyl methacrylate), and acrylonitrile monomers. Often, graftlinking agents are added to either the rubbery or hard polymer phases to increase the strength of attachment of the shell to the core.

Generally, as the rubbery weight fraction of an IM increases, the required amount of IM in the thermoplastic formulation decreases. The amount of impact modifiers in a thermoplastic resin formulation varies with the type of resin and application, but is generally between 3 and 30 parts based on 100 parts thermoplastic resin ("phr"). In creating "efficient" impact modifiers, therefore, the weight fraction of the rubbery core in the IM is typically maximized. However, it has been conventionally known that if the rubbery core fraction is too high then the hard shell polymer is not able to completely cover the rubbery core, thereby resulting in poor powder properties and dispersibility. Depending on the monomers used, the maximum core:shell weight ratio in powdered impact modifiers has conventionally been about 88:12. It is therefore desirable to increase the rubbery weight fraction in impact modifiers for plastics which have good powder properties and disperse readily in thermoplastic resins using conventional equipment.

Processing aids for thermoplastic resins are typically polymers and copolymers containing units polymerized from ethylenically unsaturated monomers such as vinyl aromatic, (meth)acrylonitrile, and/or C1–C4 alkyl methacrylate monomers. Processing aids are typically prepared using emulsion polymerization techniques to yield dispersions of 20–500 nm mean diameter hard polymer particles having a molecular weight in the range of from at least 50,000 to greater than 5,000,000 g/mol and a Tg greater than 25° C. The processing aid particle dispersions are typically dried and isolated to form a free-flowing powder, the powder particles having a 50–500 micron mean diameter. This PA powder is subsequently added to thermoplastic resin formulations.

The amount of PA used in a thermoplastic resin formulation varies with the type of resin and application, but is generally between 1 and 15 phr. Processing aids are commonly compatible with the thermoplastic resin. For example, processing aids based on polymers and copolymers prepared with methyl methacrylate ("MMA") monomer which have a molecular weight greater than 1,000,000 g/mol are commonly added to PVC resin formulations to promote quick fusion (melting), and thereby increasing process efficiency, of the PVC resin. Processing aids are also useful in increasing the melt strength of thermoplastic resins, which is important during certain types of process applications, such as during foaming and thermoforming of molten thermoplastic resin blend formulations.

U.S. Pat. No. 5,442,012 describes encapsulated plastics additives containing both impact modifier and flow improving (processing aid) particles for modifying the impact properties and processing characteristics of PVC and thermoplastic matrix polymers. Both impact modifier and processing aid particles are prepared separately at particle sizes less than 100 nm by emulsion polymerization, co-microagglomerated at temperatures above 70° C., and subsequently encapsulated by a final shell polymer. Although the encapsulated shell polymer allows for the isolation of the impact modifier having acceptable flow properties, its presence dilutes the concentration and effectiveness of the impact modifier and processing aid components in the encapsulated plastics additives. Moreover, the impact modifying efficiencies afforded by these plastics additives are limited because the impact modifier particles must have a particle size below 100 nm. As a result, using these encapsulated plastics additive powders in PVC provide similar, but not improved, impact strength and processing characteristics compared to using equal amounts of separate impact modifier and processing aids.

The present inventors have discovered new plastics additives powders and processes for preparing these powders that overcome the shortcomings of U.S. Pat. No. 5,442,012. The present inventors have discovered new plastics additives powder compositions that combine the functionality of a high rubber IM with the functionality of a PA without requiring an encapsulating shell and without requiring that the mean particle size of the IM and PA is less than 100 nm diameter. The plastics additives of the present invention further provide improved, impact strength and processing characteristics compared to using equal amounts of separate impact modifier and processing aids in PVC formulations. Enhanced impact strength results by providing plastic additive powders containing IM particles having rubber contents exceeding 88% by weight of the IM, while excellent powder properties and processing aid functionality are provided by the method of coagulating these high rubber IM particles with PA particles. As a result, the plastics additives of the present invention provide thermoplastic resin formulators with: (1) ease of use in handling one powdery additive rather than two (both an IM and a PA); (2) reduced costs by allowing less total plastics additives to be used; and (3) improved impact properties as powdery impact modifiers containing greater than 88% rubber are now possible.

The plastics additives powder compositions of the present invention are provided as powder particles having IM particles and first and second PA polymer particles. When blended in thermoplastic resins such as PVC, the IM polymer particles increase the impact strength and the PA polymer particles improve process efficiency and melt strength. Unexpectedly, we have found that the impact and processing properties achieved by the particular compositions of the present invention are more efficient and/or provide performance improvements compared to using the separate IM and PA powders. The PA particles also function to affect the preparation of high rubber IM polymer particles having rubber weight fractions greater than 88% as a free-flowing powder. Moreover, the PA particles further function to increase the dispersibility of such high rubber soft polymer particles in thermoplastic resins.

In a first aspect of the present invention, there is provided a plastics additives powder composition providing a combination of impact modifying and processing characteristics in thermoplastic resins, the composition comprising:

(a) from 50 to 98 parts by weight of impact modifier particles, the impact modifier particles having a mean particle size greater than 100 nm;
(b) from 0 to 48 parts by weight of first processing aid particles; and
(c) from 2 to 50 parts by weight of second processing aid particles, wherein the composition of the second processing aid particles is the same as, or different than, the composition of the first processing aid particles,
wherein the total parts by weight of the impact modifier particles, the first processing aid particles, and the second processing aid particles is equal to 100.

In as second aspect of the present invention, there is provided a plastics additives powder composition providing a combination of impact modifying and processing characteristics in thermoplastic resins, the composition comprising:

(a) from 82 to 93 parts by weight of impact modifier particles having a mean particle size greater than 100 nm, the impact modifier particles comprising from 89 to 94 parts by weight of at least one rubbery polymer, and 6 to 11 parts by weight of at least one hard polymer;
(b) from 5 to 10 parts by weight of first processing aid particles having a mean particle size greater than 100 nm, the first processing aid particles having a molecular weight greater than 1,000,000 g/mol; and
(c) from 2 to 8 parts by weight of second processing aid particles having a mean particle size greater than 100 nm, the second processing aid particles having a molecular weight greater than 1,000,000 g/mol,
wherein the composition of the second processing aid particles is the same as, or different than, the composition of the first processing aid particles,
wherein the total parts by weight of the impact modifier particles, the first processing aid particles, and the second processing aid particles is equal to 100.

In a third aspect of the present invention, there is provided a method for preparing a plastics additives powder providing a combination of impact modifying and processing characteristics in thermoplastic resins, the method comprising the steps of:

(a) preparing a first aqueous particle dispersion comprising:
 (i) from 50 to 98 parts by weight of impact modifier particles, the impact modifier particles having a mean particle size greater than 100 nm, and
 (ii) from 0 to 48 parts by weight of first processing aid particles;
(b) coagulating the first aqueous particle dispersion to form a coagulated slurry;
(c) adding a second aqueous particle dispersion to the coagulated slurry, the second aqueous particle dispersion comprising,
 from 2 to 50 parts by weight of second processing aid particles, wherein the composition of the second processing aid particles is the same as, or different than, the composition of the first processing aid particles, and wherein the total parts by weight of the impact modifier particles, the first processing aid particles, and the second processing aid particles is equal to 100; and
(d) drying the coagulated slurry to less than 5 weight percent water to form a free-flowing powder.

In a fourth aspect of the present invention, there is provided a method for preparing a plastics additives powder providing a combination of impact modifying and processing characteristics in thermoplastic resins, the method comprising the steps of:

(a) preparing a first aqueous particle dispersion comprising:
   (i) from 50 to 98 parts by weight of impact modifier particles, the impact modifier particles having a mean particle size greater than 100 nm, and
   (ii) from 0 to 48 parts by weight of first processing aid particles;
(b) coagulating the first aqueous particle dispersion to form a coagulated slurry;
(c) drying the coagulated slurry to form a wetcake;
(d) adding a second aqueous particle dispersion to the wetcake, the second aqueous particle dispersion comprising,
   from 2 to 50 parts by weight of second processing aid particles, wherein the composition of the second processing aid particles is the same as, or different than, the composition of the first processing aid particles, and
   wherein the total parts by weight of the impact modifier particles, the first processing aid particles, and the second processing aid particles is equal to 100; and
(e) drying the wetcake to less than 5 weight percent water to form a free-flowing powder.

In a fifth aspect of the present invention, there is provided a thermoplastic resin blend, comprising: (A) a thermoplastic resin, and (B) a plastics additives powder composition according to the first aspect of the present invention; wherein the weight ratio of (A):(B) is in the range of from 1:99 to 99:1.

In a sixth aspect of the present invention there is provided a method of modifying a thermoplastic resin, comprising: (I) melt blending the thermoplastic resin blend of the fourth aspect of the present invention.

As used herein, the term C1 to C12 alkyl (meth)acrylate refers to the class of compounds containing the alkyl esters of methacrylic acid or acrylic acid, wherein the alkyl esters have from one to twelve carbon atoms.

As used herein, the term (meth)acrylonitrile refers to the compounds acrylonitrile and methacrylonitrile.

As used herein, the term "parts" refers to parts by weight.

As used herein, the term "mean particle size" refers to the mean diameter of polymer particles.

All ranges disclosed herein are inclusive and combinable.

The following abbreviations are used herein: ALMA=ally methacrylate; BA=butyl acrylate; BMA=butyl methacrylate; EA=ethyl acrylate; IM=impact modifier; MMA=methyl methacrylate; N2=nitrogen; PA=processing aid; PD=particle dispersion; p.s.=particle size; SFS=sodium formaldehyde sulfoxylate; SLS=sodium lauryl sulfate; SPS=sodium persulfate; tBHP=t-butyl hydroperoxide; DALMA=diallyl maleate; DIW=deionized water; DSC=differential scanning calorimetry; GPC=gel permeation chromatography; Mw=weight average molecular weight.

The plastics additives powder composition of the present invention provides a combination of impact modifying and processing characteristics in thermoplastic resins. The composition of the present invention contains: from 50 to 98, preferably from 75 to 96, most preferably from 82 to 93 parts by weight of IM particles; from 0 to 48, preferably from 3 to 18, most preferably from 5 to 10 parts by weight of first PA particles; and from 2 to 50, preferably from 2 to 18, most preferably from 2 to 8 parts by weight of second PA particles. In the present invention, the second PA particles are the same as, or different than, the first PA particles. In the plastics additives of the present invention, the total parts by weight of the IM particles, the first PA particles, and the second PA particles is equal to 100.

The IM particles of the present invention comprise from 80 to 100, preferably from 88 to 96, most preferably from 89 to 94 parts by weight of at least one rubbery polymer, and from 0 to 20, preferably from 4 to 12, most preferably from 6 to 11 parts by weight of at least one hard polymer. The total parts by weight of rubbery and hard polymers is equal to 100.

The IM particles are readily prepared according to the art of core/shell emulsion polymerization to provide one or more IM particles having a mean particle size greater than or equal to 100 nm, preferably in the range of from 100 to 500 nm, and more preferably in the range of from 100 to 300 nm. Preparation of acrylic core/shell impact modifiers are readily prepared according to the teachings in U.S. Pat. Nos. 3,859,389 and 5,612,413.

The rubbery polymers of the IM particles are preferably in the form of a spherical core particle, although it is possible for the IM to have rubbery domains. The rubbery polymers comprise polymerized units derived from one or more ethylenically unsaturated monomers, wherein the glass transition temperature of the at least one rubbery polymer is less than 25° C., preferably less than 0° C., most preferably less than −40° C. Such rubbery polymers can be prepared from polymerized units derived from one or more ethylenically unsaturated monomers known in the impact modifier are, such as alkyl acrylates, 1,3-dienes, vinyl acetate, siloxanes, alpha-olefins, and mixtures thereof.

In the IM particles, for reasons of cost and efficacy it is preferred that the $C_1$ to $C_{12}$ alkyl (meth)acrylates in the core polymer is BA. Such core polymers can include homopolymers of BA, copolymers of BA with other acrylates, such as ethyl acrylate, 2-ethylhexyl acrylate and the like, copolymers with monomers of higher refractive index, such as styrene and the like, copolymers with (meth)acrylonitrile and the like. The molecular weight of the core polymers of the IM particles may be controlled by use of chain transfer agents, such as alkyl mercaptans.

For best impact properties, it is preferred that the rubbery polymer, especially if formed from an acrylate monomer such as BA or 2-ethylhexyl acrylate, further contains 0.1 to 5 parts by weight of units derived from at least one multi-unsaturated monomer, such as at least one of ALMA, allyl acrylate, DALMA, diallyl fumarate divinylbenzene, a di- or triacrylate ester of a polyol, or a di- or trimethacrylate ester of a polyol, and the like to function as a rubbery crosslinker and/or graft linker to the hard polymer.

The at least one hard polymer of the IM is composed of at least one domain that has preferably a shell-like morphology, and most preferably a shell-like morphology disposed externally to, and grafted to the rubbery polymer. It is preferred that the IM particles further comprise from 0.01 to 5 weight percent of one or more multi-ethylenically unsaturated units so that at least 80 weight percent of the at least one hard polymer is grafted to the rubbery polymer.

The IM may contain additional shells between, or external to, the rubbery polymer and hard polymer domains. Such additional shells, if present, can further be derived from particular monomers, such as styrene, for improvement of refractive index, as long as the other requirements of the first core/shell polymer are met.

The first and second PA particles are prepared according to the art of emulsion polymerization (e.g., U.S. Pat. No. 3,833,686) to provide one or more PA particles having a mean particle size in the range of from 20 to 500 nm, preferably from 70 to 300 nm, and most preferably from 100 to 300 nm. The first PA particles and second PA particles can each include single-stage, two-stage, and/or multi-stage polymer particles, as well as core/shell polymer particles.

The first and second PA particles each are comprised of polymerized units derived from one or more ethylenically unsaturated monomers. The preferred monomers include those selected from vinyl aromatics, butadiene, C1–C8 alkyl (meth)acrylates, (meth)acrylonitriles, and mixtures thereof. It is particularly preferred that the processing aids contain at least 50, preferably 75 parts by weight methyl methacrylate copolymerized with up to 50, preferably up to 25 parts by weight one or more C1–C12 alkyl (meth)acrylates, styrene, (meth)acrylonitrile, and mixtures thereof.

In the present invention, the first and second processing aids have a "hard" polymer having glass transition temperatures measured by DSC of at least 25° C., preferably at least 50° C. The Mw of the "hard" polymer of each PA are preferably greater than 100,000 g/mol, and more preferably greater than 1,000,000 g/mol. In certain thermoplastic formulations applications, such as PVC foam, it is desirable that the molecular weight of the PA is greater than 4,000,000 g/mol. In the case of two-stage or multistage core/shell polymer particles, it is preferred that the outer or shell polymer is such a "hard" polymer.

The "hard" polymers of the first and second processing aids may also be formed from homo- or copolymers of monomers such as styrene, methyl methacrylate, BA, ethyl acrylate, and the like, especially when the particle is prepared as a single-stage polymer particle. Although it is preferred that the processing aid polymers contain no crosslinker, the polymers may contain one or more units derived from multifunctional monomers containing two or more double bonds, such as from about 0.1 to about 5% of at least one of ALMA, allyl acrylate, DALMA, diallyl fumarate, divinylbenzene, a di- or triacrylate ester of a polyol, or a di- or trimethacrylate ester of a polyol.

In order for the plastics additive to have good compatibility with many thermoplastic matrix resins, such as PVC, it is preferred that the hard polymer domains (e.g., shells) of both of the IM and the first and second processing aids contain a majority of units derived from MMA. It is more preferred that the hard polymer domains of the IM contain more than 90% by weight MMA units and that the hard polymer domains of the first and second processing aids contain less than 90% by weight MMA units. For example, the hard polymer domains of the IM may contain a homopolymer of methyl methacrylate, or copolymers of methyl methacrylate with up to about 50%, preferably up to about 20%, of at least one co-monomer such as ethyl acrylate, BA, 2-ethylhexyl acrylate, butyl methacrylate, styrene, acrylonitrile, and the like.

Various surfactants known in the emulsion polymerization art can be used in preparing the particle dispersions used in the present invention. Surfactants include, but are not limited to, alkali metal or ammonium salts of long-chain alkylsulfonic acids, long-chain alkylsulfates, derivatives of aromatic sulfonates, ethoxylated alyaryl phosphates, fatty acids. Examples include sodium lauryl sulfate, sodium dodecylbenzene sulfonate, potassium dodecylbenzene sulfonate, lauryl(ethoxy)sulfates and sulfonates, lauryl(polyethoxy)sulfates and sulfonates, alkaryl(polyethoxy)sulfates and sulfonates, and the like.

The IM particles and the first and second PA particles are each provided as particle dispersions. Methods of preparing such particle dispersions for the methods of the present invention are best obtained by latex emulsion polymerization techniques as known in the emulsion polymerization art. The preferred IM dispersions and first and second PA dispersions were described earlier.

In the method for preparing the plastics additives powder of the present invention, the first step involves preparing a first aqueous particle dispersion. The first aqueous particle dispersion is prepared by combining, mixing, or blending from 50 to 98, preferably from 80 to 95, most preferably from 85 to 90 parts by weight of IM particles, and from 0 to 48, preferably 3 to 18, and most preferably 5 to 10 parts by weight of first PA particles.

The first aqueous particle dispersion has a percent solids weight fraction in the range of from 2% to 70%, preferably from 5% to 60%, and most preferably from 10% to 50%. These percent solids weight fraction ranges can be achieved by blending the IM and first PA particle dispersions each having the desired solids weight fraction, or having the desired weight fraction when combined. Accordingly, the solids weight fractions of each IM and PA particle dispersion is in the range of from 2% to 70%, preferably from 5% to 60%, and most preferably from 10% to 50%. In addition, the IM and first PA polymer dispersions can be prepared at particularly high percent solids weight fraction and subsequently diluted to achieve a preferred lower percent solids weight fraction. It is also possible to dilute the first aqueous particle dispersion to achieve a preferred lower percent solids concentration for the subsequent coagulation step. The first aqueous particle dispersion may also contain up to 5 parts by weight of a dispersion of flow aid polymer particles, such as those described in U.S. Pat. No. 4,463,131.

The first aqueous particle dispersion is subsequently coagulated to form a coagulated slurry. The coagulation step can be carried out by various coagulation methods known in the art, such as aqueous electrolyte (salt) coagulation using an aqueous solution of a salt of an inorganic acid, such as sodium chloride, magnesium acetate, calcium hypophosphite. It is preferred that the electrolyte solution is prepared with a salt containing a divalent cation, such as calcium chloride ($CaCl_2$). Coagulation with a water soluble, or partially water soluble solvent, such as methanol and the like ("methanol-coagulation") is also possible. It is preferred to coagulate the first aqueous particle dispersion using aqueous electrolyte coagulation wherein the aqueous electrolyte solution has a concentration of between 0.1 and 2.0, preferably from 0.2 to 1.0 weight percent. It is also important to control the coagulation temperature because too high a coagulation temperature results in excessively large particles causing poor dispersion. In contrast, too low a temperature results in excessively small particles resulting in a wide particle size span and excessive dust. Coagulation temperature varies with the latex composition, particle size, emulsifier type, and pH. For example, when the first aqueous particle dispersion contain acrylic-based IM polymer particles having greater than 88% rubber, the coagulation temperature is in the range of from 0° C. to 45° C., preferably in the range from 0° C. to 20° C. In contrast, when the first aqueous particle dispersion contain acrylic-based IM polymer particles having less than 88% rubber, the coagulation temperature can be as high as 85° C., but preferably less than 70° C. The resulting coagulated slurry should have a percent solids weight fraction in the range of from 1% to 60%, preferably from 5% to 40%, and most preferably from 5% to 20%.

The second aqueous particle dispersion is subsequently added to the coagulated slurry. The composition of the second PA particles was described earlier, and can be different in composition than the composition of the first PA particles, but it is preferred that the compositions are the same. The second aqueous particle dispersion adds from 2 to 50, preferably from 2 to 18, and most preferably from 2 to 8 parts by weight of second PA particles to the coagulated slurry. The amount of second aqueous particle dispersion added to the coagulated slurry is determined by providing that the total parts by weight of the IM particles, the first PA particles, and the second PA particles is equal to 100.

The second aqueous particle dispersion should have a percent solids weight fraction in the range of from 2% to 70%, preferably from 5% to 60%, and most preferably from 10% to 50%. These percent solids weight fraction ranges can be achieved by preparing the second PA particle dispersion by emulsion polymerization having the desired percent solids weight fraction. It is also possible to dilute the second aqueous particle dispersion to achieve a preferred lower percent solids concentration.

In the present invention it is desirable that the second PA particles, when added to the coagulated slurry, subsequently coagulate onto the coagulated slurry particles. Some of the second PA particles may also coagulate separately among the coagulated slurry particles, but this should be minimized to avoid dust in the final plastics additive powder. This subsequent coagulation of the second PA particles onto the coagulated slurry particles of the IM and first PA particles is controlled by the temperature and electrolyte concentration in the coagulated slurry. The electrolyte concentration should be in the range of 0.1% to 2.0%, preferably 0.2% to 1.0%, most preferably 0.4% to 0.6%. When the rubber content of the IM is greater than 88%, the temperature of the second aqueous particle dispersion when added to the coagulated slurry should be controlled so that the resulting mixture has a temperature in the range of from 0° C. to 45° C., preferably in the range from 0° C. to 20° C. Higher coagulation temperatures may be used when the IM rubber content is less than or equal to 88%.

After adding the second PA particles it is desirable to ensure that the second PA particles are completely coagulated in the resulting coagulated slurry. This may be accomplished by subsequently adding additional electrolyte having a concentration in the range of from 5% to 40%, preferably 10% to 40%, most preferably from 20% to 40%. Higher concentration electrolyte solutions are preferred as it is desirable to minimize the amount of excess water added in the process just prior to the drying step.

After adding the second PA particles it is also desirable to ensure that the resulting coagulated slurry forms a free flowing powder having good compaction properties after it is dried. This can be accomplished by heating the resulting coagulated slurry to a temperature of at least 85° C., preferably at least 95° C., prior to drying.

After the step of adding the second aqueous particle dispersion according the process described, the resulting coagulated slurry should have a percent solids weight fraction in the range of from 1% to 60%, preferably from 5% to 40%, and most preferably from 5% to 20%. The resulting coagulated slurry has a mean slurry particle size in the range of from 150 to 400 microns, preferably 200 to 300 microns, and most preferably 200 to 250 microns. It is also desirable that the slurry particle size distribution is narrow to avoid the presence of dust from very small particles and the presence of undesirably large slurry particles that disperse poorly in thermoplastics resins. The particle size distribution span ("span") is defined as:

$$span = \frac{d_{90} - d_{10}}{d_{50}}$$

wherein $d_x$ is the particle diameter in the particle size distribution below which x %, based on volume, of the total particles reside in the distribution. The resulting coagulated slurry of the plastics additives of the present invention has a span less than 3.0, preferably less than 2.0, and most preferably less than 1.5. It is also possible to separate out undesirably large slurry particles using various methods known in the art, such as filtration.

The resulting coagulated slurry is dried to less than 5 weight percent water to form a free-flowing powder. Various methods of drying particle slurries are readily known to those skilled in the art and are described in *Chemical Engineer's Handbook*, 5$^{th}$ *Ed.*, Perry and Chilton, Eds. 1973 which relates to the drying of solid-liquid particle dispersions. The preferred drying methods include fluidized bed dryers, rotary dryers, spray dryers, continuous or batch tray dryers, flash dryers, and pneumatic conveying dryers. During the drying step it is important to control the drying temperature so that the slurry particles do not fuse among themselves, for example by keeping the temperature of the slurry particles below the Tg of the hard polymer components (e.g., outer shells) of the individual IM and/or first and second PA polymer particles. If the drying temperature is too high then the individual polymer particles may fuse together in the powder particles which may hinder their subsequent dispersion into thermoplastic matrices. A free-flowing, low-dust plastics additives powder is achieved when the water content is less than 5%, preferably less than 3%, most preferably less than 1%.

Although it is preferred that the drying step occurs after forming the resulting coagulated slurry, it is also possible to simultaneously perform the steps of adding the second aqueous particle dispersion to the coagulated slurry and drying the resulting coagulated slurry. This is desirable for the purposes of providing overall efficient process economy.

The drying step may proceed in one step, or in multiple steps. Multiple step drying can be used to remove a sufficient amount of water from the resulting coagulated slurry to form a wetcake, the wetcake preferably having less than 60 weight percent water. In this case one could first form a wetcake prior to subsequent drying wherein additional plastic additive components are added to the wetcake prior to final drying into a powdery product. Wetcake can be prepared according to methods known in the art, for example by filtration of the slurry using a vacuum filter belt, a centrifuge, a Buchner funnel, and the like.

Several other embodiments of the method of the present invention are also possible. One variation involves drying the coagulated slurry to less than 50 weight percent water to form a wetcake and subsequently or simultaneously adding the second aqueous particle dispersion to the wetcake, followed by drying to a free-flowing, low-dust plastics additives powder as described above.

Another variation of the present invention includes adding one or more other known plastic additive compositions, in either powder or aqueous form. These additives can be blended into the composition after the final coagulation step or formation of wetcake using standard equipment such as high-speed mixers, blenders, kneaders, extruders, fluidized drying beds, and the like. Other ingredients typically blended in thermoplastic formulations, such as lubricants, thermal stabilizers, waxes, dyes, pigments, fillers, and the like, may each have an aqueous solution, liquid, powdered, or pellet form, and may also be included in the present invention using this mixing equipment.

The plastics additive powders of the present invention may be used in various ways, including preparation of thermoplastic resin blends. The thermoplastic resin blends of the present invention contain a thermoplastic resin and a plastics additives powder of the present invention, wherein the weight ratio of the additive to the resin is in the range of from 1:99 to 99:1. These blends are readily prepared by melt-blending methods that are known in the art of plastics processing. For example, the plastics additive powders of the present invention can be blended with thermoplastic resin powders or pellets and melt processed using an extruder.

The thermoplastic resin blends of the present invention are especially useful as impact-modified thermoplastics when the weight ratio of additive to resin is in the range of from 3:97 to 30:70. The thermoplastic resin blends of the present invention can also be blended with higher amounts of the plastics additives powders of the present invention for preparing concentrated pellets of the plastics additive powders of the present invention.

The thermoplastic resin blends of the present invention may also be formed into pellets by the steps of blending, extruding and pelletizing using conventional plastics processing equipment. Such pellets may readily contain the plastics additive powders of the present invention and one or more thermoplastic resins in the weight ratio of additive to resin can be in the range of from 10:90 to 80:20.

The thermoplastic resin blends of the present invention have many uses, including calendered sheet, thermoformed sheet, injection molded articles, blowmolded articles, extruded articles, and the like. When the component monomers of the plastics additive are added in a way that the refractive indices are carefully matched to the thermoplastic resin, the resulting polymers are useful in applications requiring transparency.

The plastics additives of the present invention are preferably blended into poly(vinyl chloride) ("PVC") and chlorinated PVC ("CPVC") to improve impact strength and processability. The plastics additives of the present invention are especially useful for manufacturing PVC siding, window profiles, and other exterior building products where both efficient processing, impact strength, and weatherability of the PVC product are needed. The plastics additive is useful for preparing PVC siding when the first and second processing aids are present in the range of from 5 to 20 parts be weight in the plastics additive, and the plastics additive is present in the PVC formulation in the range of from 4 to 20 phr.

The plastics additive powders of the present invention are also envisioned to be useful for preparing PVC foam when the first and second processing aids are present in the range of from 25 to 50 parts be weight in the plastics additive powder.

The plastics additives may be blended into many thermoplastics other than PVC, including thermoplastics based on polymers and copolymers of alkyl (meth) methacrylate, vinyl aromatics (e.g., styrene), and/or (meth)acrylonitrile, aromatic polyesters such as poly(ethylene terephthalate) or poly(butylene terephthalate), polycarbonates, polyamides, polyacetals, and polyolefins. The plastics additives may be admixed with various blends and alloys of one or more of these thermoplastic resins. The utility of such blends is varied, but include equipment panels and housings, such as for appliances or computers and automobile parts such as door panels and bumpers.

EXAMPLES

In the preparation of the particle dispersions described below, the mean particle size (diameter) was measured with photon correlation spectroscopy using a Brookhaven Instruments BI-90.

Particle Dispersion A ("PD-A")

Preparation of 94% Rubber Core Impact Modifier Polymer Dispersion

The following ingredients were added to a reactor and heated to 55° C. under an inert N2 environment: 1346.42 g water, 19.56 g of a 0.25% solution of para-nitrosophenol, 16.99 g of a 1.44% solution of tartaric acid, and 2.19 g of a 28% solution of SLS. At 55° C., a monomer mix containing 134.99 g of BA, 0.85 g of 28% SLS, 0.95 g of ALMA and 34.85 g of water was added to the reactor, followed immediately by the addition of 0.22 g of tBHP, 1.31 g of SFS, and 24.99 g of water. The initial monomer mix in the reactor was allowed to react, held at peak temperature for 15 minutes, and then cooled to 53° C. A second monomer mix containing 32.65 g water, 4.06 g of 20% SLS, 107.90 g of BA and 0.76 g of ALMA was added to the reactor, followed by 0.17 g of tBHP. After reaction, the mixture was held at peak temperature for 15 minutes, then cooled to 53° C. A third monomer mix containing 146.92 g water, 18.29 g of 28% SLS, 485.59 g of BA, and 3.42 g of ALMA was added to the reactor, followed by 0.78 g of tBHP. The mix was allowed to react, held at peak temperature for 15 minutes, then cooled to 57° C. A fourth monomer mix containing 146.92 g of water, 18.29 g of SLS, 485.59 g of BA, 3.42 g of ALMA, 13.08 g of DALMA, and 10 g of water was added to the reactor, followed by 0.78 g of tBHP. The mixture was allowed to react and held at peak temperature for 3 minutes, followed by addition of 0.2 g tBHP, 0.14 g of SFS and 8.33 g of water. The mixture was held at constant temperature for 1 hour, then cooled to 53° C. A mixture of 2.97 g of 28% SFS, 20 g water, 83.36 g MMA, and 0.25 g nDDM was prepared, then added to the reactor together with 150 g of additional water. The mixture was stirred for 10 minutes, then 0.18 g SFS and 15 g water was added, followed by an additional 3 minutes of stirring. 0.18 g of SPS and 15 g of water was added to the reactor and the mixture was allowed to react. After the mixture reached peak temperature, 0.08 g of SFS was added together with 10 g of water, followed by 0.08 g of SPS and 10 g of additional water. The mixture was held at constant temperature for 1 hour, then cooled to room temperature. The resulting mixture was a PD of core-shell IM polymer particles having a mean particle size of 130 nm, with rubber core of 94% and an outer hard phase of 6%.

PD-B

Preparation of 88% Rubber Core Impact Modifier Polymer Dispersion

This particle dispersion was made according to the procedure for PD-A, with the exception that the MMA monomer mixture contained 5.94 g of 28% SFS, 40 g water, 166.72 g MMA, and 0.50 g nDDM, then added to the reactor together with 150 g of additional water, and that after stirring for 10 minutes, 0.24 g SFS and 15 g water was added, followed by an additional 3 minutes of stirring, then 0.24 g of SPS and 15 g of water was added to the reactor and the mixture was allowed to react. The remaining steps were the same as for PD-A. The resulting mixture was a dispersion of core-shell polymer particles having a mean particle size of 130 nm, with rubber core of 88% and an outer hard phase of 12%. Part of the dispersion was dried to a powder which can be used as a separate IM.

Processing Aid Dispersion: PD-C

A dispersion of two-stage polymer PA particles was prepared according to the procedure described in Example 1 of U.S. Pat. No. 3,833,686 with the following modifications: the composition of stage 1 was 60% MMA, and 40% EA; the composition of stage 2 was MMA; the weight ratio of stage 1:stage 2 was 1:3; the mean particle size was 250 nm; the solids weight fraction of the particle dispersion was 54%. The Mw measured by GPC was 1.2 million g/mol. The Tg of the overall polymer measured by DSC was 97° C. Part of the dispersion was dried to a powder and used as a separate PA.

Flow Aid Dispersion: PD-D

A dispersion of non-elastomeric hard flow aid polymer particles was prepared according to the procedure described in Example 2 of U.S. Pat. No. 4,463,131 having the following characteristics: the overall uniform composition was 90% MMA, and 10% EA; the mean particle size was 102 nm; and the solids weight fraction of the particle dispersion was 40%.

Processing Aid Dispersion: PD-E

A dispersion of two-stage polymer PA particles was prepared according to the procedure described in U.S. Pat. No. 3,833,686 with the following modifications: the composition of stage 1 was 55% MMA, 35% EA, and 10% BMA; the composition of stage 2 was 88% MMA, 6% EA, and 6% BMA; the weight ratio of stage 1:stage 2 was 1:3; the mean particle size was 170 nm; and the solids weight fraction of the particle dispersion was 48%. The Mw measured by GPC was 3.2 million g/mol. The Tg of the overall polymer measured by DSC was 90° C. Part of the dispersion was dried to a powder and used as a separate PA.

Processing Aid Dispersion: PD-F

A dispersion of single stage polymer processing aid particles was prepared according to the procedure described in U.S. Pat. No. 3,833,686 with the following modifications: the overall uniform composition was 84% MMA, 4% BMA, and 12% BA; the mean particle size was 194 nm; and the solids weight fraction of the particle dispersion was 54%. The Mw measured by GPC was 6.0 million g/mol. The Tg of the overall polymer measured by DSC was 91° C. Part of the dispersion was dried to a powder and used as a separate PA.

Processing Aid Dispersion: PD-G

A dispersion of single stage polymer processing aid particles was prepared according to the procedure described in U.S. Pat. No. 3,833,686 with the following modifications: the overall uniform composition was 88% MMA, and 12% BA; the mean particle size was 130 nm; and the solids weight fraction of the particle dispersion was 38%. The Mw measured by GPC was 4.5 million g/mol. The Tg of the overall polymer measured by DSC was 93° C. Part of the dispersion was dried to a powder and used as a separate PA.

Example 1

80.6 Parts IM (94% Rubber), 7.5 Parts First PA, 11.9 Parts Second PA

After dilution to 30% solids level, 4333.33 g PD-A IM dispersion was mixed with 405 g of 30% solids PD-C PA dispersion to prepare a first aqueous particle dispersion. The dispersion mixture was cooled to 7° C. In a separate container, 9476.67 g of a 0.405% solution of CaCl2 was continuously stirred and cooled to 7° C. While maintaining steady agitation, the first aqueous dispersion was slowly poured into the electrolyte solution to coagulate the first aqueous dispersion to form a coagulated slurry. After several minutes, an additional 639.68 g of the 30% solids PD-C (second aqueous dispersion) was added to the coagulated slurry. After a 1 minute delay, 631.78 g of a 20% solution of CaCl2 was subsequently added to this resulting coagulated slurry. The resulting coagulated slurry was heated to 85° C., held at this temperature for 5 minutes, and cooled to room temperature. The slurry was filtered and washed with an additional 8000 g of water, then dried to a powder using a fluid bed dryer.

Example 2

77.1 Parts IM (88% Rubber), 7.5 Parts First PA, 3.5 Parts Flow Aid, and 11.9 Parts Second PA After dilution to 30% solids level, 4000 g PD-B IM dispersion was mixed with 391.67 g of 30% solids PD-C PA dispersion, and 180 g of 30% solids PD-D flow aid dispersion. The dispersion mixture was heated to 42° C. In a separate container, 9143.33 g of a 0.405% solution of CaCl2 was continuously stirred and heated to 42° C. While maintaining steady agitation, the mixture was slowly poured into the vessel containing the electrolyte solution. After several minutes, an additional 617.18 g of the 30% solids PD-C was added. After a 1 minute delay, 609.56 g of a 20% solution of CaCl2 was added to the mixture. The resulting coagulated slurry was heated to 85° C. and held at this temperature for 5 minutes. The slurry was cooled, filtered, washed and dried as in Example 1.

Comparative Example 3

88.1 Parts IM (88% Rubber), 11.9 Parts Flow Aid, No First or Second PA

After dilution to 30% solids level, 4492 g PD-B IM dispersion was heated to 40° C. In a separate container, 8984 g of a 0.405% solution of CaCl2 was continuously stirred and heated to 40° C. While maintaining steady agitation, the dispersion was slowly poured into the vessel containing the electrolyte solution. After several minutes, 606.42 g of 30% solids PD-D flow aid dispersion was added to the vessel to make a mixture. After a 1 minute delay, 6598.93 g of a 20% solution of CaCl2 was added to the mixture. The resulting coagulated slurry was heated to 85° C. and held at this temperature for 5 minutes. The slurry was cooled, filtered, washed and dried as in Example 1.

Example 4

The three powders from Examples 1, 2 and Comparative Example 3 were evaluated for their compaction, bulk density and powder particle distribution. Bulk density was determined by dividing the weight of grams of powder in a 100 cc cup by 100 to give density in g/cc. Powder flowability was determined by the funnel flow test in ASTM D 1895–96. Powder compaction was determined by placing 27 cc of loose powder in a cup, tapping with a 3.5 kg weight for three minutes, and then placed an a 20 mesh screen and vibrated for 30 seconds. The compaction value (percent) is equal to the weight remaining on the screen divided by the initial weight multiplied by 100%. Mean particle size and span were determined using a Coulter LS-130 particle sizing instrument (Beckman Coulter, Inc., Fullerton, Calif.). Results are shown in Table 1.

TABLE 1

Powder Properties of Coagulated Blends

| Powder | Density (g/cc) | Funnel Flow (sec) | Compaction | Mean p.s. (micron) | p.s. span |
|---|---|---|---|---|---|
| Ex. 1 | 0.495 | 12.7 | 12% | 309 | 1.7 |
| Ex. 2 | 0.575 | 10.0 | 14% | 306 | 1.8 |
| Comp. Ex. 3 | 0.595 | 9.6 | 14% | 302 | 1.8 |

The results in Table 1 show that the two plastics additives of the present invention (Ex. 1 and Ex. 2) have similar powder density, flow, and compaction properties as those of Comparative Example 3 containing just IM and flow aid particles.

Example 5

The three powder samples from Examples 1, 2 and Comparative Example 3 were evaluated for their impact properties in PVC. In the cases of Examples 1 and 2, in which an IM was coagulated with a processing aid, no additional PA powder was added to the PVC formulation. In the case of Comparative Example 3, an additional 1 part of dried PD-C PA powder (separately freeze dried, then dried in a vacuum oven) was added to the formulation, so that all three PVC formulations contained equivalent amounts of processing aid. Each powder was blended into a PVC masterbatch formulation to prepare a modified formulation (Table 2). 200 g of each modified formulation were processed for 8 minutes on a 2-roll mill at the stated temperature, then pressed into 3 mm thick plates, by applying 1 MPa pressure at high temperature for 2 minutes, followed by 7 MPa pressure at high temperature for 3 minutes, followed by 7 MPa pressure while cooling for 5 minutes. From each plate, Charpy specimens were cut and notched at a 0.1 mm radius, then tested for impact according to 0.1 mm v-notch Charpy Impact method, ISO R 179. The impact results are shown in Table 3.

TABLE 2

PVC Masterbatch Formulation

| Ingredient, Source | Phr |
|---|---|
| PVC K-68 | 100 |
| Dibasic Pb Phosphite | 3 |
| Neutral Pb Stearate | 0.3 |
| Dibasic Pb Stearate | 0.7 |
| Calcium Stearate | 0.3 |
| Dicarboxylic acid ester | 0.4 |
| Neutral Ester Wax | 0.5 |
| AC-307A High MW polyethylene wax (Allied-Signal) | 0.05 |
| Processing Aid, PARALOID K-175 (Rohm and Haas, Philadelphia, PA) | 0.5 |
| CaCO3 | 5 |
| TiO2 | 4 |
| Plastics Additives Powder(s) (IM + PA) | varies |

TABLE 3

0.1 mm v-notch Charpy Impact

| Plastics Additive | | Additional Processing Aid Powder | | Charpy Impact Energy (kJ/m2) at Mill/Press Temperature | | |
|---|---|---|---|---|---|---|
| Ex. | phr | Source | phr | 185 C. | 190 C. | 195 C. |
| 1 | 8 | — | — | 16.7 | 13.3 | 12.1 |
| 2 | 8 | — | — | 15.4 | 12.0 | 10.7 |
| Comp. 3 | 6 | PD-C | 1 | 13.7 | 11.0 | 9.9 |
| Comp. 3 | 7 | PD-C | 1 | 12.5 | 11.5 | 9.3 |
| Comp. 3 | 8 | PD-C | 1 | 15.9 | 13.7 | 12.0 |

The results in Table 3 show that the best impact properties are observed using the plastics additive of Example 1. These results also show that PVC impact properties are improved when 8 phr of the plastics additive powder of Example 2 is blended in a PVC formulation compared to separately blending 7 phr of the impact modifier/flow aid plastics additive of Comparative Example 3 with 1 phr of PA powder from PD-C.

Example 6

The plastics additives powders of Examples 1, 2 and Comparative Example 3 were evaluated for PVC processing properties using a Brabender-type mixing bowl equipped with twin paddles. 62 g of the PVC formulation (Table 2) was added to the mixer at 110° C., equilibrated for 1 minute, then heated at a rate of 8° C. per minute to a final temperature of 190° C., while mixing at a constant paddle rate of 60 rpm. When the mixture reached peak torque corresponding to PVC fusion, the torque value, elapsed time and melt temperature were recorded. The equilibrium torque value was recorded 10 minutes after the mixture had been mixing at the final set temperature of 190° C. The results are shown in Table 4.

TABLE 4

PVC Processing Evaluation in Mixing Bowl

| Plastics Additive | | Additional Processing Aid Powder | | Fusion Time | Fusion Torque | Fusion Temp. | Equil. Torque |
|---|---|---|---|---|---|---|---|
| Ex. | phr | Source | phr | sec | (m-g) | ° C. | (m-g) |
| 1 | 8 | — | — | 500 | 2228 | 174 | 1588 |
| 2 | 8 | — | — | 467 | 2383 | 170 | 1598 |

TABLE 4-continued

PVC Processing Evaluation in Mixing Bowl

| Plastics Additive | | Additional Processing Aid Powder | | Fusion Time | Fusion Torque | Fusion Temp. | Equil. Torque |
|---|---|---|---|---|---|---|---|
| Ex. | phr | Source | phr | sec | (m-g) | ° C. | (m-g) |
| Comp. 3 | 6 | PD-C | 1 | 478 | 2364 | 172 | 1572 |
| Comp. 3 | 7 | PD-C | 1 | 475 | 2370 | 170 | 1580 |
| Comp. 3 | 8 | PD-C | 1 | 445 | 2511 | 169 | 1598 |

The results in Table 4 show that the plastics additives of Examples 1 and 2 provide similar processing characteristics in PVC formulations compared to separately adding IM powder (Comp. Ex. 3) and PA powders (PD-C).

Example 7

The plastics additives powders from Examples 1, 2 and Comparative Example 3 were evaluated for their effect on die swell properties when preparing PVC extrudates. PVC formulations (Table 2) were extruded using a lab-scale single screw extruder equipped with a single stage screw running at 45 rpm, and a 0.635 cm diameter vertical capillary die. The three barrel zones and die were programmed to a set temperature of 170/180/185 and 190° C., respectively. After achieving a steady state output rate and a melt temperature of approximately 180° C., samples of extrudate were collected. The hot extrudate was cut immediately below the die exit so as to collect repeated lengths of extrudate which were exactly 50.8 cm in length. The difference in weight between rods of equivalent length served as an indirect measurement of the relative degree of melt elasticity and swell at the die exit. Each example was repeated twice and the rod weights were averaged. Results are shown in Table 5.

TABLE 5

Die Swell Measurements on Coagulated Blends in PVC

| Plastics Additive | | Additional Processing Aid Powder | | Extruded Rod Weight, Average |
|---|---|---|---|---|
| Source | phr | Source | phr | grams |
| Ex. 1 | 8 | — | — | 28.2 |
| Ex. 1 | 8 | PD-C | 1 | 29.5 |
| Ex. 1 | 7.2 | — | — | 28.2 |
| Ex. 1 | 7.2 | PD-C | 0.1 | 28.2 |
| Ex. 2 | 8 | — | — | 28.4 |
| Ex. Comp. 3 | 7 | — | — | 27.5 |
| Ex. Comp. 3 | 7 | PD-C | 1 | 28.8 |
| Ex. Comp. 3 | 7 | PD-C | 2 | 29.6 |

The results in Table 5 show that the plastics additives of Examples 1 and 2 provide similar low die swell in PVC formulations compared to separately adding IM powder (Comp. Ex. 3) with PA powders (PD-C).

The results in Tables 3 to 5 therefore show that 8 phr of the plastics additives of Examples 1 and 2 improved impact performance without degrading process performance in PVC compared to the traditional approach of separately adding 7 phr of a powdered IM with 1 phr of a traditional powdered processing aid. In this case, impact performance was improved without increasing the total PHR weight of the IM in the PVC.

The results in Tables 3 to 5 also show that the plastics additives of Examples 1 and 2 are more efficient in improving PVC impact properties and processing performance than the traditional blend of IM and PA powders. In this case, the efficiency of the plastics additives in PVC formulations is improved by more than 10%.

Examples 8–10: Coagulation Experiments

Comparative Example 8

87.5 Parts IM (94% Rubber), 12.5 Parts First PA, No Second PA

After dilution to 30% solids level, 600 g of PD-A was mixed with 257 g of 10% solids PD-C. The resulting first aqueous dispersion was cooled to 10° C. In a separate container, 1200 g of a 0.405% solution of CaCl2 was continuously stirred and cooled to 10° C. While maintaining steady agitation, the first aqueous dispersion was slowly poured into the electrolyte solution. After a 1 minute delay, 80 g of a 20% solution of CaCl2 was added to the mixture. The resulting coagulated slurry was heated to 95° C. and held at this temperature for 5 minutes. After cooling to room temperature, the sample was filtered and washed with an additional 500 g of water, then dried in a fluid bed dryer. The resulting powder properties are provided in Table 6.

Example 9

87.5 Parts IM (94% Rubber), No First PA, 12.5 Parts Second PA

A coagulated blend was prepared as described in Example 8, except that the PD-C was not pre-mixed with the PD-A, but rather, added to the coagulated dispersion just prior to the addition of the final 20% CaCl2 solution. The resulting powder properties are provided in Table 6.

Example 10

87.5 Parts IM (94% Rubber), No First PA, 12.5 Parts Second PA

A coagulated blend was prepared as described in Example 9, except that the PD-C was not pre-mixed with the PD-A, but rather, added to the coagulated dispersion after the 20% CaCl2 solution was added. The resulting powder properties are provided in Table 6.

Example 11

The compaction, powder particle size and distribution, and bulk density were measured as described in Example 4, for the powders produced in Examples 8–10. Results are shown in Table 6.

TABLE 6

Powder Properties of Plastics Additives with Processing Aid Added in One Step

| Ex. | Process | Compaction | Density (g/cc) | Mean p.s. (microns) | p.s. Span |
|---|---|---|---|---|---|
| Comp. 8 | Mix Both Dispersions, Then Coagulate | 100% | 0.38 | 331 | 0.9 |

TABLE 6-continued

Powder Properties of Plastics Additives
with Processing Aid Added in One Step

| Ex. | Process | Compaction | Density (g/cc) | Mean p.s. (microns) | p.s. Span |
|---|---|---|---|---|---|
| 9 | Coagulate First Dispersion, Add Second Dispersion, Then Coagulate | 0% | 0.45 | 395 | 1.7 |
| 10 | Coagulate First Dispersion, Then Add Second Dispersion | 0% | 0.52 | 207 | 1.8 |

The results in Table 6 show that the best powder compaction properties (0% compaction) are obtained when the second aqueous particle dispersion is added to the mixture after coagulating the first aqueous particle dispersion.

Examples 12–14

87.5 Parts IM (94% Rubber), 8.5 Parts First PA, 4 Parts Second PA: Various PAs

The 94% rubber IM dispersion (PD-A) was coagulated at 5° C. with PA dispersions PD-E, PD-F, and PD-G according to the method described in Example 8. The weight fraction of IM was 87.5 parts and the total weight fraction of the processing aids were 12.5 parts in each example (Table 7). The CaCl2 concentration used in the initial coagulation was 0.6%, and each PA dispersion amount was divided so that 68% of the total PA (amounting to 8.5 parts as the first PA) was first mixed with the IM dispersion prior to the initial coagulation step. The remaining 32% of each PA dispersion (amounting to 4.0 parts as the second PA) was added after the initial coagulation step, and prior to the addition of the 20% CaCl2 solution. Heating and drying the slurry followed that described in Example 8. The powders of Examples 12–14 were analyzed for powder properties as described in Example 4. Results are shown in Table 8.

TABLE 7

Compositions of Examples 12–14

| | Coagulated Slurry | | | | Second PA Dispersion | |
|---|---|---|---|---|---|---|
| | IM Dispersion | | First PA Dispersion Mixed with IM | | Added to Coagulated Slurry | |
| Ex. | Source | Parts | Source | Parts | Source | Parts |
| 12 | PD-A | 87.5 | PD-E | 8.5 | PD-E | 4.0 |
| 13 | PD-A | 87.5 | PD-F | 8.5 | PD-F | 4.0 |
| 14 | PD-A | 87.5 | PD-G | 8.5 | PD-G | 4.0 |

TABLE 8

Powder Properties of Examples 12–14

| Ex. | Density (g/cc) | Compaction % | Funnel Flow Time sec | Slurry mean p.s. microns | Slurry p.s. Span |
|---|---|---|---|---|---|
| 12 | 0.54 | 0 | 11 | 250 | 1.7 |
| 13 | 0.54 | 0 | 11 | 247 | 2.1 |
| 14 | 0.55 | 0 | 10 | 264 | 1.6 |

The results in Table 8 show that various processing aids can be coagulated with 94% rubber IM to provide plastics additives having excellent powder properties. The slurry mean particle size in the range of 240–270 microns yields fast funnel flow times. The slurry particle size (p.s.) span is in the range of from 1.6 to 2.1 indicates that the slurry particle size distribution is narrow around the mean p.s. Accordingly, the powders are easily handled and are not dusty.

Example 15

The powders of Examples 12–14 and Comparative Example 3 were evaluated for their effect on PVC processing characteristics as described in Example 6. The results are shown in Table 9.

TABLE 9

PVC Processing Properties of Modified Thermoplastics: Plastics Additives Compared to Traditional Powder Blends

| Ex. | Loading Level phr | Fusion Time sec | Fusion Torque m-g | Equilibrium Torque m-g |
|---|---|---|---|---|
| Comp. Ex. 3 | 7 phr blended with 0.9 phr PD-E powder | 448 | 2572 | 1595 |
| Ex. 12 | 7.2 | 443 | 2526 | 1597 |
| Ex. 13 | 7.2 | 444 | 2527 | 1579 |
| Ex. 14 | 7.2 | 454 | 2430 | 1571 |

The results in Table 9 show that the plastics additives of Examples 12, 13, and 14 provide similar processing characteristics at a 7.2 phr level in PVC as traditional plastics additive powder blends containing 7 phr of an IM/flow aid powder and 0.9 phr of a PA powder.

Example 16

The powders of Examples 13 and 14 were evaluated for their effect on PVC impact properties, according to the methods described in Example 5. The results are shown in Table 10.

TABLE 10

Impact Properties of PVC Formulations
Prepared with Coagulated Plastics Additives

| Coagulated Plastics Additive | | Additional Processing Aid Powder | | 15° C. Charpy Impact Energy (kJ/m2) at Mill/Press Temperature: | | |
|---|---|---|---|---|---|---|
| Source | phr | Source | phr | 180 C. | 185 C. | 190 C. |
| Comp. Ex. 3 | 7 | — | — | 13.2 | 10.3 | 11.1 |
| Comp. Ex. 3 | 7 | PD-F | 0.9 | 13.7 | 13.9 | 10.3 |

TABLE 10-continued

Impact Properties of PVC Formulations
Prepared with Coagulated Plastics Additives

| Coagulated Plastics Additive | | Additional Processing Aid Powder | | 15° C. Charpy Impact Energy (kJ/m2) at Mill/Press Temperature: | | |
|---|---|---|---|---|---|---|
| Source | phr | Source | phr | 180 C. | 185 C. | 190 C. |
| Comp. Ex. 3 | 7 | PD-G | 0.9 | 14.1 | 12.6 | 10.6 |
| Ex. 13 | 7.2 | — | — | 13.7 | 12.4 | 10.9 |
| Ex. 14 | 7.2 | — | — | 13.5 | 12.8 | 9.5 |

The results in Table 10 show that the plastics additives of Examples 13 and 14 provide similar processing characteristics at a 7.2 phr level in PVC as traditional plastics additive powder blends containing 7 phr of an IM/flow aid powder and 0.9 phr of a PA powder.

Example 17

The powders of Examples 12–14 and Comparative Example 3 were evaluated for their die swell properties, as described in Example 7. The extruder barrel temperatures were set at 175/185/190° C. and the die temperature was 195° C. The results are shown in Table 11.

TABLE 11

Die Swell Properties of PVC Modified by Coagulated Plastics Additives

| Coagulated Plastics Additive | | Additional Processing Aid Powder | | Weight of 20" Extruded Rod |
|---|---|---|---|---|
| Source | phr | Source | phr | grams |
| Comp. Ex. 3 | 7.0 | — | — | 29.8 |
| Comp. Ex. 3 | 7.0 | PD-E | 0.9 | 33.5 |
| Ex. 12 | 7.2 | — | — | 33.3 |
| Ex. 13 | 7.2 | — | — | 33.9 |
| Ex. 14 | 7.2 | — | — | 33.3 |

The results in Table 11 show that the plastics additives of Examples 12–14 provide similar low die swell in PVC formulations compared to separately using 7.0 phr IM powder (Comp. Ex. 3) and 0.9 phr of PA powder prepared from PD-E.

The results in Tables 7 to 11 therefore show that 8 phr of the plastics additives of Examples 12–14 improves impact performance without degrading process performance in PVC compared to the traditional approach of separately adding 7–7.2 phr of a powdered IM with 0.9–1.0 phr of a traditional powdered processing aid. In this case, impact performance is improved without increasing the total weight of modifiers (hence without increasing cost) in the PVC.

Example 18

The plastics additives powders of Examples 12–14 were evaluated for their effect on PVC melt strength and melt elongation. The powders were blended with the PVC masterbatch of Example 5, and extruded using a single screw lab-scale extruder running at 50 rpm, with barrel set temperatures of 175/185/195° C. and a die set temperature of 195° C. The PVC formulation was extruded at a rate of approximately 14 g per minute through a small 2 mm diameter capillary vertical die. The polymer melt strand exiting the die was fed into a Rheotens-type measuring device and the tensile properties of the hot melt were recorded.

The results are shown in Table 12.

TABLE 12

Melt Tensile Properties of PVC Blends

| Coagulated Plastics Additive | | Additional Processing Aid Powder | | Melt Tensile Strength | Melt Draw |
|---|---|---|---|---|---|
| Source | phr | Source | phr | kPA | Ratio |
| Comp. Ex. 3 | 7.0 | — | — | 763 | 13.2 |
| Comp. Ex. 3 | 7.0 | PD-E | 0.9 | 1,390 | 20.0 |
| Ex. 12 | 7.2 | — | — | 1,376 | 19.7 |
| Ex. 13 | 7.2 | — | — | 1,792 | 22.4 |
| Ex. 14 | 7.2 | — | — | 1,316 | 18.7 |

The results in Table 12 show that the melt properties (melt tensile strength and melt draw ratio) of PVC containing the Comparative Example 3 plastics additive (IM and flow aid, no processing aid) are decreased compared to a separate combination of Comparative Example 3 IM and the PD-E processing aid. Moreover, 7.2 phr of the plastics additives of Examples 12, 13, and 14 provide similar PVC melt properties as compared to a total of 7.9 phr of separate IM and PA powders.

The results in Tables 7 to 12 therefore show that 7.2 phr of the plastics additives of Examples 12–14 provide similar impact properties as well as processing performance in PVC compared to the traditional approach of separately adding 7 phr of an IM and 0.9 phr of a PA. The plastics additives powders of the present invention therefore are suprisingly more efficient than the traditional approach of using separate IM and PA powders.

Comparative Example 19

77.1 Parts IM (96% Rubber), 7.5 Parts First PA, 3.5 Parts Flow Aid, and 11.9 Parts Second PA An IM dispersion was prepared as in PD-A, except that the rubber core ratio was increased to 96% of the total impact modifier. An attempt to coagulate the resulting dispersion by the method of Example 2 at various temperatures between 5° C. and 23° C. resulted in a large mass of rubbery, tacky non-flowing material.

Comparative Example 20

77.1 Parts IM (74 nm, 94% Rubber), 7.5 Parts First PA, 3.5 Parts Flow Aid, and 11.9 Parts Second PA A IM dispersion was prepared as in PD-A, except that the mean particle size was decreased to 74 nm from 130 nm. An attempt to coagulate the resulting dispersion by the method of Example 2 at various temperatures between 5° C. and 23° C. resulted in a large mass of rubbery, tacky non-flowing material.

Example 21

77.1 Parts IM (245 nm, 88% Rubber), 7.5 Parts First PA, 3.5 Parts Flow Aid, and 11.9 Parts Second PA An IM dispersion was prepared as in PD-B, except that the mean particle size was increased to 245 nm from 130 nm. Coagulation of the resulting dispersion with PD-C PA dispersion and PD-D flow aid dispersion by the method of Example 2 at 23° C. resulted in a free-flowing powder.

Example 22

77.1 Parts IM (80% Rubber), 7.5 Parts First PA, 3.5 Parts Flow Aid, and 11.9 Parts Second PA A copolymer dispersion was prepared as in PD-B, except that the rubber core level was decreased to 80% of the total polymer. Coagulation of the resulting dispersion by the method of Example 2 at 63° C. resulted in a free-flowing powder.

We claim:

1. A plastics additives powder composition providing a combination of impact modifying and processing characteristics in thermoplastic resins, the composition comprising powder particles comprising:
   (a) from 50 to 98 parts by weight of impact modifier particles, the impact modifier particles comprising 80 to 100 parts by weight of at least one rubbery polymer and having a mean particle size greater than 100 nm;
   (b) from 0 to 48 parts by weight of first processing aid particles; and
   (c) from 2 to 50 parts by weight of second processing aid particles having a molecular weight of at least 1,000,000 g/mol, wherein the composition of the second processing aid particles is the same as, or different than, the composition of the first processing aid particles,
   wherein the total parts by weight of the impact modifier particles, the first processing aid particles, and the second processing aid particles is equal to 100;
   wherein the powder particle comprises a powder particle inner region and a powder particle outer region;
   wherein the powder particle inner region comprises the impact modifier particles and the first processing aid particles;
   wherein the powder particle outer region surrounds the powder particle inner region; and
   wherein the powder particle outer region comprises the second processing aid particles.

2. The composition according to claim 1, wherein the composition comprises from 82 to 93 parts by weight of impact modifier particles.

3. The composition according to claim 1, wherein the impact modifier particles comprise:
   from 80 to 96 parts by weight of at least one rubbery core polymer, and
   from 4 to 20 parts by weight of at least one hard shell polymer.

4. A plastics additives powder composition providing a combination of impact modifying and processing characteristics in thermoplastic resins, the composition comprising powder particles comprising:
   (a) from 82 to 93 parts by weight of impact modifier particles, the impact modifier particles having a mean particle size greater than 100 nm, the impact modifier particles comprising from 89 to 94 parts by weight of at least one rubbery polymer, and 6 to 11 parts by weight of at least one hard polymer;
   (b) from 5 to 10 parts by weight of first processing aid particles having a mean particle size greater than 100 nm, the first processing aid particles having a molecular weight greater than 1,000,000 g/mol; and
   (c) from 2 to 8 parts by weight of second processing aid particles having a mean particle size greater than 100 nm, the second processing aid particles having a molecular weight greater than 1,000,000 g/mol,
   wherein the composition of the second processing aid particles is the same as, or different than, the composition of the first processing aid particles,
   wherein the total parts by weight of the impact modifier particles, the first processing aid particles, and the second processing aid particles is equal to 100;
   wherein the powder particle comprises a powder particle inner region and a powder particle outer region;
   wherein the powder particle inner region comprises the impact modifier particles and the first processing aid particles;
   wherein the powder particle outer region surrounds the powder particle inner region; and
   wherein the powder particle outer region comprises the second processing aid particles.

5. A method for preparing a plastics additives powder providing a combination of impact modifying and processing characteristics in thermoplastic resins, the method comprising the steps of:
   (a) preparing a first aqueous particle dispersion comprising:
      (i) from 50 to 98 parts by weight of impact modifier particles, the impact modifier particles having a mean particle size greater than 100 nm, and
      (ii) from 0 to 48 parts by weight of first processing aid particles;
   (b) coagulating the first aqueous particle dispersion to form a coagulated slurry;
   (c) adding a second aqueous particle dispersion to the coagulated slurry, the second aqueous particle dispersion comprising,
      from 2 to 50 parts by weight of second processing aid particles having a molecular weight of at least 1,000,000 g/mol, wherein the composition of the second processing aid particles is the same or different than the composition of the first processing aid particles, and
   wherein the total parts by weight of the impact modifier particles, the first processing aid particles, and the second processing aid particles is equal to 100; and
   (d) drying the coagulated slurry to less than 5 weight percent water to form a free-flowing powder comprising powder particles.

6. The method according to claim 5, wherein the first aqueous dispersion comprises:
   from 80 to 95 parts by weight of impact modifier particles, and
   from 3 to 18 parts by weight of first processing aid particles.

7. The method according to claim 5, wherein the coagulated slurry in
   step (b) is formed at a temperature in the range of from 0° C. to 45° C.

8. The method according to claim 5, wherein the coagulated slurry after step (c) has a mean slurry particle size in the range of from 150 to 400 microns and a particle size distribution span less than 3.0.

9. A thermoplastic resin blend, comprising:

(A) a thermoplastic resin, and (B) a plastics additives powder composition providing a combination of impact modifying and processing characteristics in thermoplastic resins, comprising powder particles comprising:

(a) from 50 to 98 parts by weight of impact modifier particles, the impact modifier particles comprising 80 to 100 parts by weight of at least one rubbery polymer and having a mean particle size greater than 100 nm;

(b) from 0 to 48 parts by weight of first processing aid particles; and (c) from 2 to 50 parts by weight of second processing aid particles having a molecular weight of at least 1,000,000 g/mol, wherein the composition of the second processing aid particles is the same as, or different than, the composition of the first processing aid particles, and wherein the total parts by weight of the impact modifier particles, the first processing aid particles, and the second processing aid particles is equal to 100;

wherein the weight ratio of (A):(B) is in the range of from 1:99 to 99:1;

wherein the powder particle comprises a powder particle inner region and a powder particle outer region;

wherein the powder particle inner region comprises the impact modifier particles and the first processing aid particles;

wherein the powder particle outer region surrounds the powder particle inner region; and wherein the powder particle outer region comprises the second processing aid particles.

10. A method for modifying a thermoplastic resin, comprising:

(I) melt blending:

(A) a thermoplastic resin; and (B) a plastics additives powder composition providing a combination of impact modifying and processing characteristics in thermoplastic resins, the composition comprising powder particles comprising:

(a) from 50 to 98 parts by weight of impact modifier particles, the impact modifier particles comprising 80 to 100 parts by weight of at least one rubbery polymer and having a mean particle size greater than 100 nm;

(b) from 0 to 48 parts by weight of first processing aid particles; and (c) from 2 to 50 parts by weight of second processing aid particles having a molecular weight of at least 1,000,000 g/mol, wherein the composition of the second processing aid particles is the same as, or different than, the composition of the first processing aid particles, and wherein the total parts by weight of the impact modifier particles, the first processing aid particles, and the second processing aid particles is equal to 100;

wherein the weight ratio of (A):(B) is in the range of from 1:99 to 99:1;

wherein the powder particle comprises a powder particle inner region and a powder particle outer region;

wherein the powder particle inner region comprises the impact modifier particles and the first processing aid particles;

wherein the powder particle outer region surrounds the powder particle inner region; and wherein the powder particle outer region comprises the second processing aid particles.

11. The plastics additives powder composition of claim 1, wherein the powder particles have a mean slurry particle size in the range of from 150 to 400 microns and a particle size distribution span less than 3.0.

\* \* \* \* \*